United States Patent
Lee et al.

(10) Patent No.: US 7,450,482 B2
(45) Date of Patent: Nov. 11, 2008

(54) METHOD FOR OPTIMIZING WRITE PARAMETERS OF OPTICAL STORAGE MEDIUM AND RECORDING DEVICE THEREFOR

(75) Inventors: Yao-Yu Lee, Hsinchu (TW); Hsin-Po Wang, Taoyuan County (TW); Yueh-Hsuan Tsai, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 604 days.

(21) Appl. No.: 11/164,407

(22) Filed: Nov. 22, 2005

(65) Prior Publication Data

US 2007/0041293 A1    Feb. 22, 2007

(30) Foreign Application Priority Data

Aug. 18, 2005    (TW) .............................. 94128155 A

(51) Int. Cl.
*G11B 27/36* (2006.01)
*G11B 7/00* (2006.01)
(52) U.S. Cl. ................................. 369/47.53; 369/53.26
(58) Field of Classification Search ............... 369/47.53
See application file for complete search history.

(56) References Cited

U.S. PATENT DOCUMENTS

| | | | | |
|---|---|---|---|---|
| 6,456,576 | B1 * | 9/2002 | Kuribayashi et al. | 369/47.53 |
| 6,563,775 | B2 * | 5/2003 | Sato | 369/47.53 |
| 6,912,188 | B2 * | 6/2005 | Morishima | 369/47.53 |
| 7,068,579 | B2 * | 6/2006 | Tasaka et al. | 369/59.24 |
| 7,095,691 | B2 * | 8/2006 | Takeda | 369/47.53 |
| 7,154,829 | B1 * | 12/2006 | Roh | 369/47.55 |
| 7,170,835 | B1 * | 1/2007 | Roh et al. | 369/47.53 |

\* cited by examiner

*Primary Examiner*—Thang V Tran
(74) *Attorney, Agent, or Firm*—Jianq Chyun IP Office

(57) ABSTRACT

A method for optimizing write parameters of an optical storage medium is provided. The method is adapted for a recording device using the optical storage medium. The method includes loading the optical storage medium having a test area into the recording device, determining a combination of an original write strategy and an original write power according to the optical storage medium, writing test data into the test area with the combination of the original write strategy and the original write power for dynamically adjusting the combination of the original write strategy and the original write power to obtain a combination of an optimal write strategy and an optimal write power, and writing data into the optical storage medium with the combination of the optimal write strategy and the optimal write power.

20 Claims, 8 Drawing Sheets

METHOD FOR OPTIMIZING WRITE PARAMETERS OF OPTICAL STORAGE MEDIUM AND RECORDING DEVICE THEREFOR

CROSS-REFERENCE TO RELATED APPLICATION

This application claims the priority benefit of Taiwan application serial no. 94128155 filed on Aug. 18, 2005. All disclosure of the Taiwan application is incorporated herein by reference.

BACKGROUND OF THE INVENTION

1. Field of the Invention

The present invention relates to a recording device for an optical storage medium, and particularly to a method for dynamically adjusting a write power and a write strategy of an optical storage medium to optimize write parameters and a recording device therefor.

2. Description of Related Art

Commercialized writable optical storage media, for example, optical disks, can be categorized into many kinds, including CD-R, CD-RW, DVD-R, DVD+R, DVD-RW, DVD+RW and DVD-RAM. Dyes and materials used for these optical storage media are different in properties. Therefore, different optical storage media support different writing speeds, so do the write powers required for writing data into these optical storage media. Therefore, a general approach is to perform a so-called optimal power calibration (OPC) at a power calibration area (PCA) in an optical storage medium before writing data therein. In other words, it is a process of writing test data at a test area, then reading test data and assessing the signal quality thereof, thus finding out an optimal write power.

FIG. 1 is a flow chart illustrating a conventional method for calibrating an optimal write power. Referring to FIG. 1, at step S10, an optical disk is loaded in the recording device, then at step S11, the recording device determines an optimal write strategy from a plurality of pre-stored write strategies according to the optical storage medium, wherein the pre-stored write strategies are either pre-stored in the optical disk by an optical disk manufacturer or pre-stored in a memory means of the recording device by a recording device manufacturer. At step S12, the recording device uses a plurality of write powers to write test data into the test area of the optical disk incorporating with the optimal write strategy. At step S13, an optimal write power is determined from the test write powers according to test data read out from the test area. Finally, at step S14, the recording device writes data into the optical disk with the optimal write strategy and the optimal write power.

FIG. 2 is a flow chart illustrating another conventional method for calibrating an optimal write power, which is applied with a constant angular velocity (CAV) writing method. Referring to FIG. 2, steps S20 to S24 are the same as steps S10 to S14 as shown in FIG. 1. Because of the CAV writing method, writing speeds are different between an inner track and an outer track of an optical disk. Using a same write strategy for both inner tracks and outer tracks is likely to cause a writing failure. Therefore, an optical disk is usually divided into many zones. The first zone to be written uses a write strategy determined from those pre-stored write strategies according to the optical disk. The other zones use optimal write strategies obtained from adjusting the optimal strategy the first zone used. Herein, the pre-stored write strategies are pre-stored in the optical disk or a memory means of the recording device.

Continue referring to FIG. 2, at step S25, judges whether it reaches the next zone, if it does not, then go back to step S24; if it does, then proceed with step S26, incorporating with the present zone, the optimal write strategy of step S24 is adjusted and then substitute for the previous write strategy, then perform an optimal write power calibration, wherein the optimal write strategy is adjusted according to the previous write strategy and the zones to be written, rather than an instantly dynamic adjustment; then write data till all data are written in.

Furthermore, another approach of the CAV writing method is pre-storing the write strategies for all the zones into a memory means of the recording device. Which zone is to be written is judged according to the recording device. Thereafter, the corresponding write strategy optimal for the given zone is read out and then the optimal write power test is performed.

The process of writing data into an optical disk is actually forming a plurality of pits or marks which present data. Forms of the pits or marks can be changed by changing a combination between write strategies and write powers. FIGS. 3A and 3B respectively illustrate write strategies for CD-R and CD-RW. Referring to FIGS. 3A and 3B, the digital data to be written into the optical disk have to be encoded, that is an eight-to-fourteen modulation (EFM). The encoded EFM signals are written into the optical disk by an optical pickup head. As shown in FIG. 3A, a write strategy having parameters including Td, Tp and Tf is adapted for writing an optical disk of CD-R; and as shown in FIG. 3B, a write strategy having parameters including Td, Tp, Tf and Tm is adapted for writing an optical disk of CD-RW. Defining a unit time of a channel clock signal as T, T has a frequency of 4.32 MHz, so 1T is equal to 230 ns. Optical disks of DVD-R/RW, DVD+R/RW and DVD-RAM have more complicated definitions of parameters.

The optical pickup head has a laser diode (LD) for providing a light beam to the optical disk. As the writing speed is relatively low, the LD has a response speed faster than the speed that the encoded data being transmitted to the optical pickup head. Therefore, the forms of the pits or marks can be changed by changing the write powers. However, as the writing speed is relatively high, the response speed of the LD is relatively close to the 3T frequency of the encoded data. Once the response speed of the LD reaches its limit, changing the write powers will not change the forms of the pits or marks.

The above-described two conventional technologies can not instantly and dynamically adjust write strategies and write powers. Therefore, they can not readjust the responsive features of all of the pickup heads by adjusting the write strategies for obtaining better writing qualities.

SUMMARY OF THE INVENTION

An object of the invention is to provide a method for optimizing write parameters of an optical storage medium and a recording device using the same, by which the write power and the write strategy of the recording device can be instantly and dynamically adjusted for optimizing the write parameters.

The present invention provides a method for optimizing write parameters of an optical storage medium, adapted for a recording device using the optical storage medium. The method for optimizing write parameters includes: loading an optical storage medium into the recording device, wherein the optical storage medium has a test area; determining a combination of an original write strategy and an original write power according to the optical storage medium; writing test data into the test area with the combination of the original write strategy and the original write power for dynamically adjusting the combination of the original write strategy and the original write power to obtain a combination of an optimal write strategy and an optimal write power; finally, writing data into the optical storage medium with the combination of the optimal write strategy and the optimal write power.

The present invention provides a recording device using an optical storage medium for optimizing write parameters of the optical storage medium. The optical storage medium includes a test area. The write parameters include write strategy and write power. The recording device includes an optical pickup unit, a signal reproducing unit, a performance measuring unit and a write parameters optimizing control unit. The signal reproducing unit is coupled to the optical pickup unit. The performance measuring unit is coupled to the signal reproducing unit. The write parameters optimizing control unit is coupled to the performance measuring unit and the optical pickup unit.

The optical pickup unit is adapted for physically reading/writing data from/into an optical storage medium. The signal reproducing unit reproduces data read from the optical storage medium. The performance measuring unit measures a performance index of data read from the optical storage medium. The write parameters optimizing control unit determines a combination of an original write strategy and an original write power according to the optical storage medium, writing test data by the optical pickup unit into the test area with the combination of the original write strategy and the original write power for dynamically adjusting the combination of the original write strategy and the original write power to obtain a combination of an optimal write strategy and an optimal write power in accordance with the performance index; and writing data into the optical storage medium with the combination of the optimal write strategy and the optimal write power.

Before data being written in the optical storage medium, the present invention writes test data into the optical storage medium, reproduces test data written in the optical storage medium for assessing the writing quality, and then instantly and dynamically adjusts the write strategy and the write power for obtaining a better writing quality when writing data into an optical storage medium. Moreover, because the write strategy can be dynamically adjusted before the optical storage medium being written, the difference between the response features of the pickup unit can be complemented.

BRIEF DESCRIPTION OF THE DRAWINGS

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE EMBODIMENTS

For more conveniently illustrating embodiments according to the present invention, an optical disk and an optical drive are respectively taken as examples for illustrating an optical storage medium and a recording device for the storage medium below.

Figure 1:
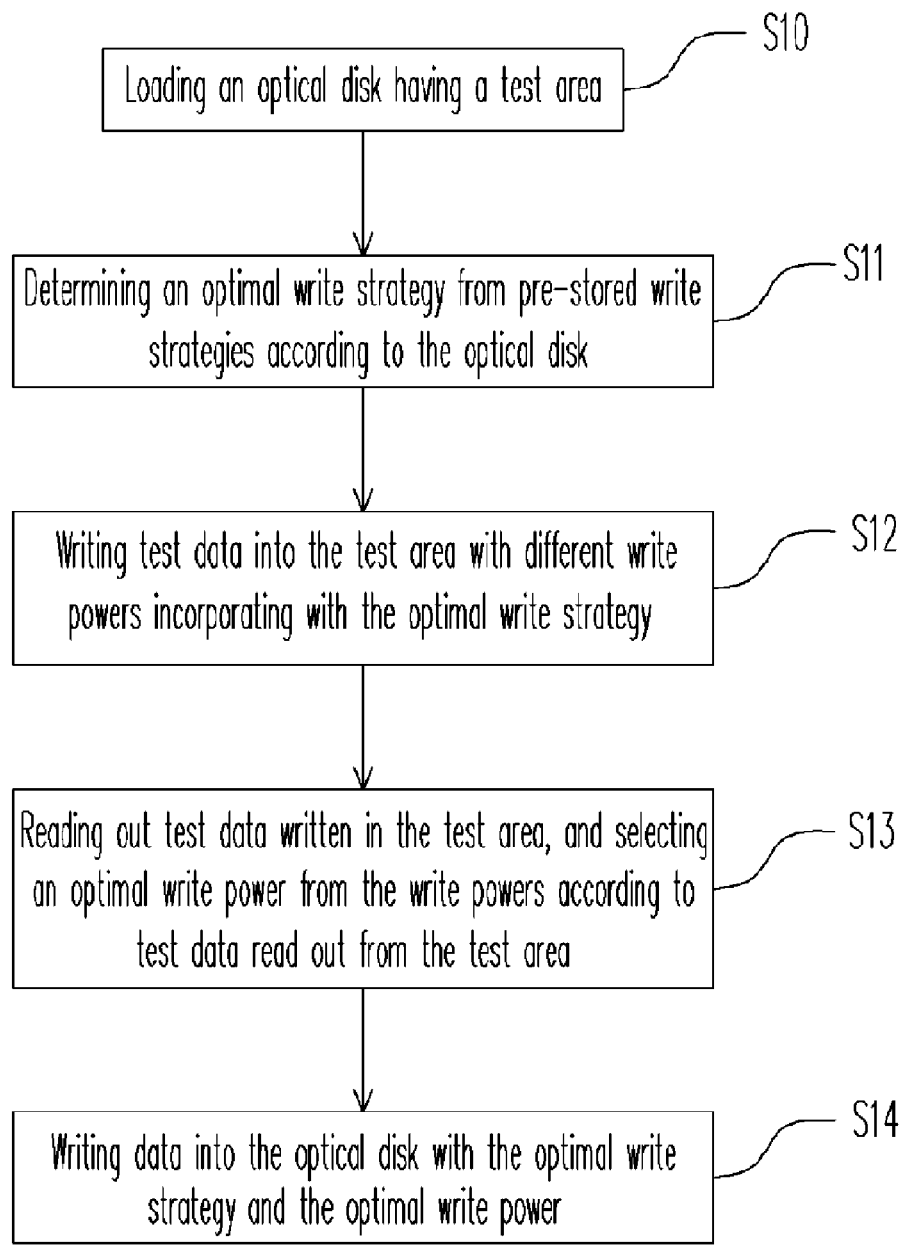
FIG. 1 is a flow chart illustrating a conventional method for calibrating an optimal write power.
Figure 2:
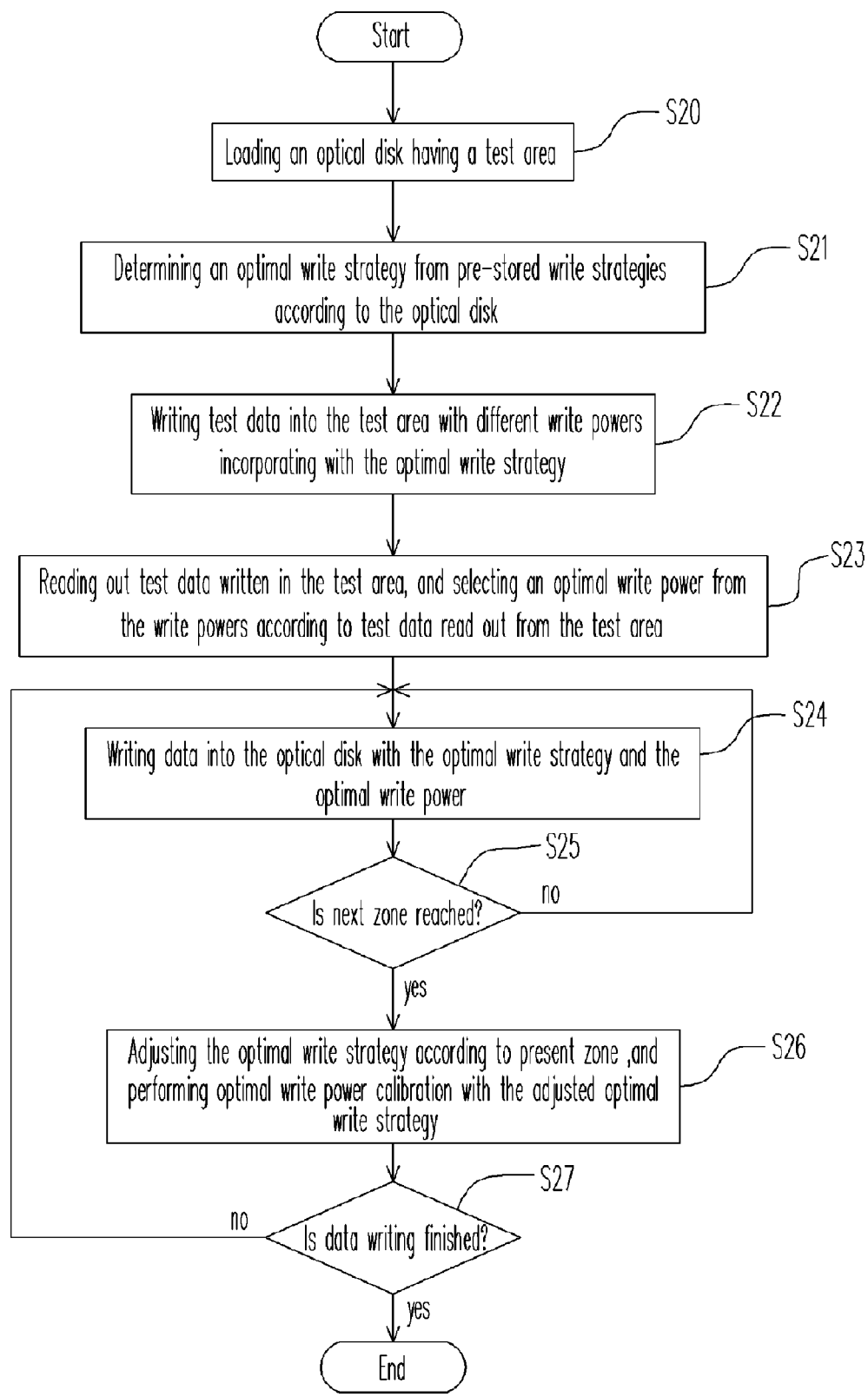
FIG. 2 is a flow chart illustrating another conventional method for calibrating an optimal write power, which is applied with a constant angular velocity (CAV) writing method.
Figure 3A:
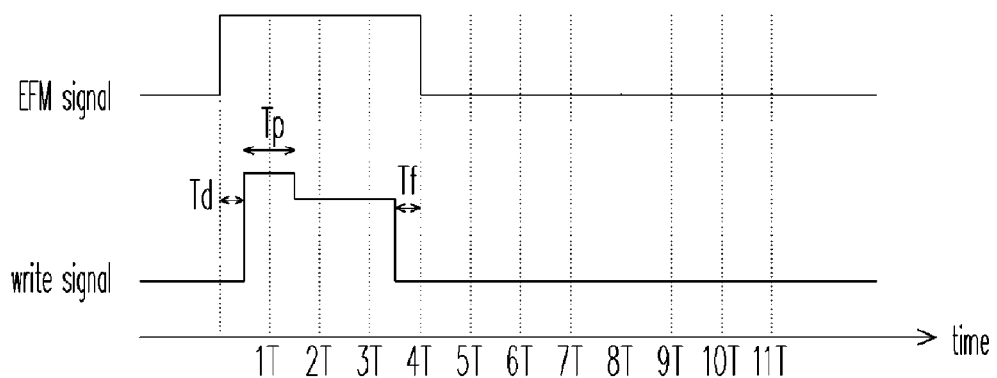
FIGS. 3A and 3B respectively illustrate write strategies for CD-R and CD-RW.
Figure 3B:
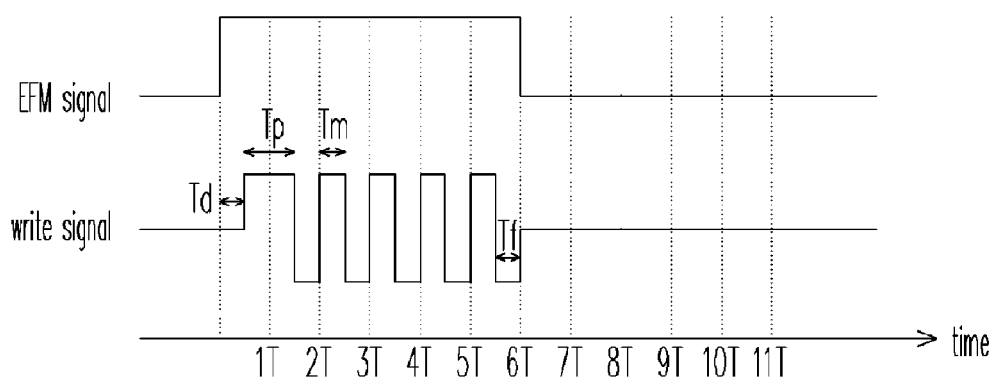
Figure 4:
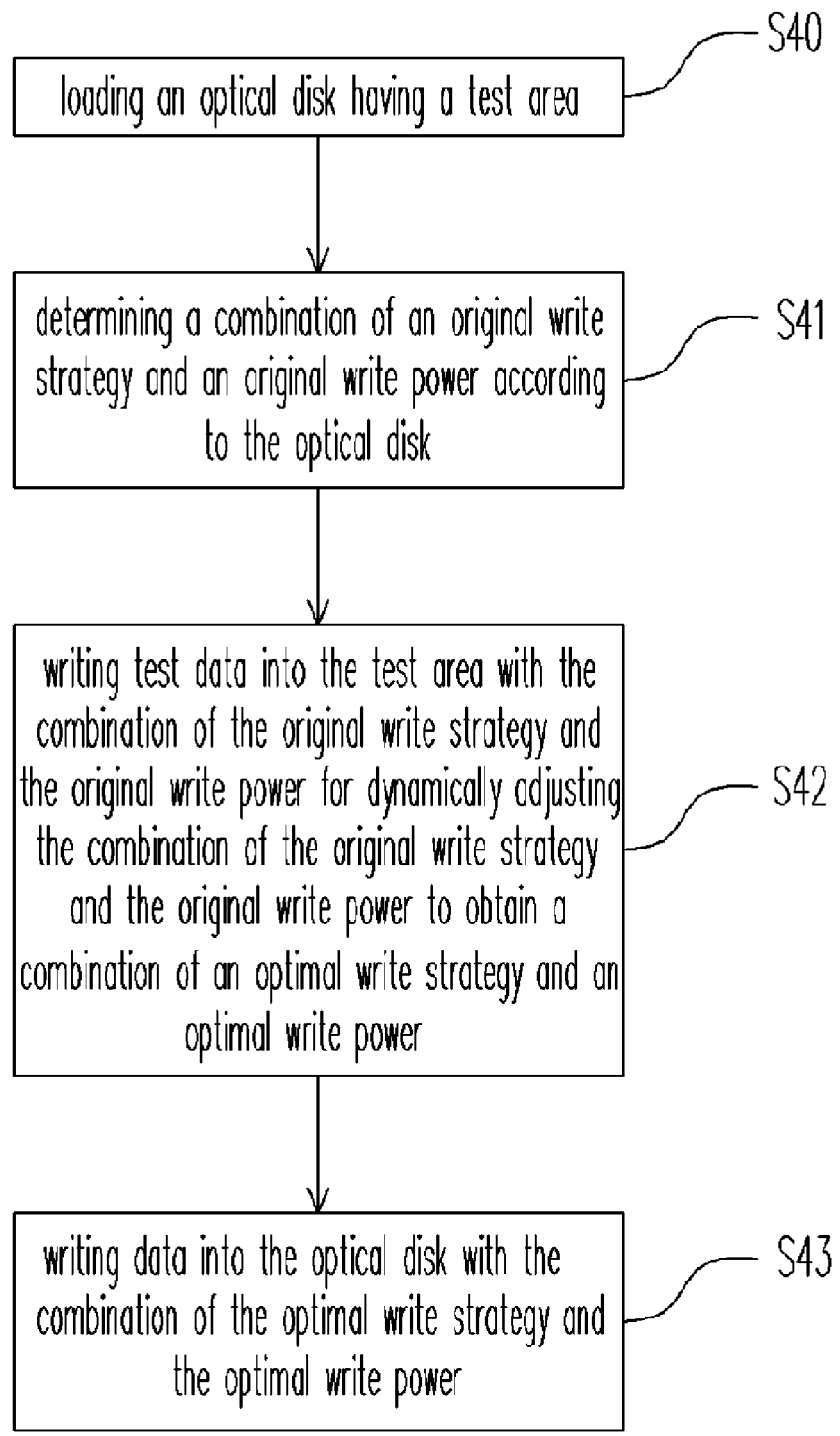
FIG. 4 is a flow chart of a method for optimizing write parameters of an optical disk according to an embodiment of the invention.

FIG. 4 is a flow chart of a method for optimizing write parameters of an optical disk according to an embodiment of the invention. Referring to FIG. 4, step S40 includes loading an optical disk having a test area into an optical drive. The optical disk, for example, can be CD-R, CD-RW, DVD-R, DVD+R, DVD-RW, DVD+RW and DVD-RAM. Generally, the power calibrating area (PCA) of the inner tracks of the optical disk includes a test area and a count area. The test area includes a plurality of areas for a plurality of test writing times. The count area stores and indicates data which have been test written in those test written areas.

Step S41 determines a combination of an original write strategy and an original write power according to the type of the optical disk. Generally, optical disk manufacturers have tested features of optical disks they produced and written the features into the optical disks. The written tested features include types, recording speeds and recording parameters of the optical disks. Step S42 includes test writing in the test area with the combination of the original write strategy and the original write power for dynamically adjusting the combination of the original write strategy and the original write power to obtain a combination of an optimal write strategy and an optimal write power; finally, step S43 includes writing data into the optical storage medium with the combination of the optimal write strategy and the optimal write power. However, there is another approach for doing do, the approach including pre-storing pre-adjusted combinations of optimal write strategies and optimal powers for different types and different manufacturers in a memory means of the optical drive. Therefore, when the optical drive judges which type and which manufacturer the loaded optical disk belongs to, it determines a combination of the pre-stored optimal write strategy and write power as the combination of the original write strategy and the original write power. Thereafter, the test area of the optical disk is test written for dynamically adjusting the combination.

Figure 5:
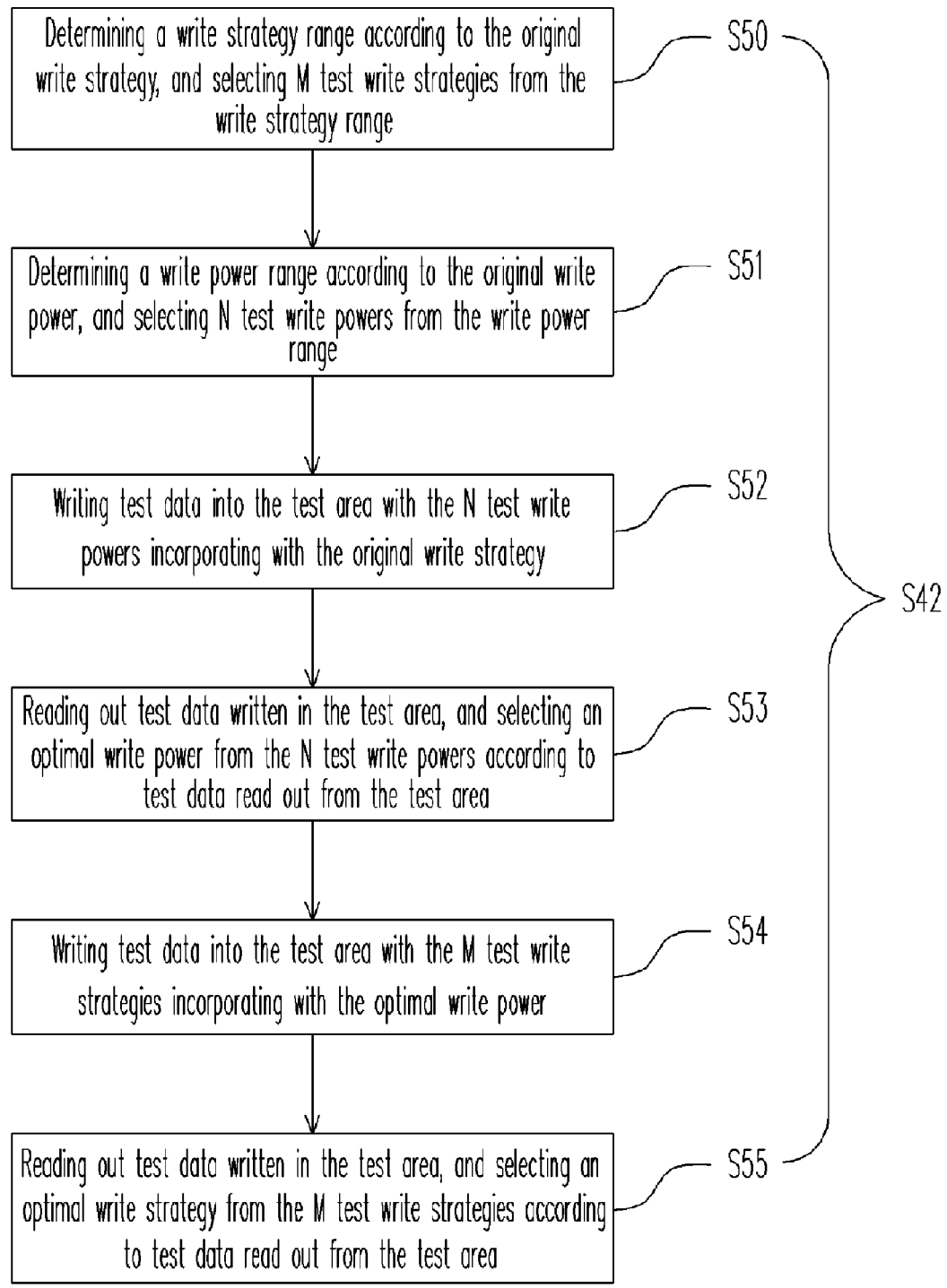
FIG. 5 is a flow chart illustrating the steps of dynamically adjusting a combination of the original write strategy and the original write power of FIG. 4 according to an embodiment of the invention.

FIG. 5 is a flow chart illustrating step S42 of FIG. 4 of dynamically adjusting a combination of the original write strategy and the original write power according to an embodiment of the invention. Referring to FIG. 5, step S50 determines a write strategy range according to the original write strategy, and selecting M test write strategies from the write strategy range, wherein the M test write strategies are represented as Td1, Td2, Td3 ..., TdM; step S51 determines a write power range according to the original write powers, and selecting N test write powers from the write power range, wherein the N test write powers are represented as P1, P2, P3 ..., PN.

The write power range is (Pmin, Pmax), wherein the upper limit Pmax is determined as the original write power plus a given value $\Delta$P1 (Pmax=P+$\Delta$P1), and the lower limit Pmin is determined as the original write power minus another given value $\Delta$P2 (Pmin=P−$\Delta$P2). According to an embodiment of the invention, $\Delta$P1 is equal to $\Delta$P2; for example, both are 20% of P. That means the write power range is ranged from P+(20%)×P to P−(20%)×P. The N test write powers, for example, are obtained by equally dividing the write power range into N shares.

Similarly, the write strategy range is (Tdmin, Tdmax), wherein the upper limit Tdmax is determined as a time parameter Td representing the original write strategy plus a given value $\Delta$Td1 (Tdmax=Td+$\Delta$Td1), and the lower limit Tdmin is determined as a time parameter Td representing the original write strategy minus another given value $\Delta$Td2 (Tdmin=Td−$\Delta$Td2). In this embodiment, the time parameter Td is a shift-of-leading-edge time parameter which affects the write strategy more, and the shift-of-leading-edge time parameter is adopted as an example, while other time parameters may also be adopted. The M test write strategies, for example, are obtained by equally dividing the write strategy range into M shares.

Then step S52 includes writing test data into the test area respectively with test write powers P1 through PN in accordance with the original write strategy Td. In other words, it includes writing test data into the test area respectively with combinations of the original write strategy and the write powers as (Td, P1), (Td, P2), (Td, P3) ... (Td, PN).

Thereafter, step S53 includes reading out test data written in the test area, and determining an optimal write power Po from the test write powers P1 through PN according to jitter values or bit error rates of the read test data. For example, if the optimal write power Po is the test write power P5, then Po=P5.

Then, step S54 includes writing test data into the test area with the test write strategies Td1 through TdM. In other words, it includes writing test data into the test area with the combinations of the write strategies Td1 through TdM and the optimal write power Po as (Td1, Po), (Td2, Po), (Td3, Po) ... (TdM, Po).

Finally, step 55 includes reading out test data written in the test area, and from which determining an optimal write strategy Tdo. As a result, the embodiment write N+M (sets of) test data into the test area for obtaining a combination (Tdo, Po) of the optimal write strategy and the optimal write power.

Figure 6:
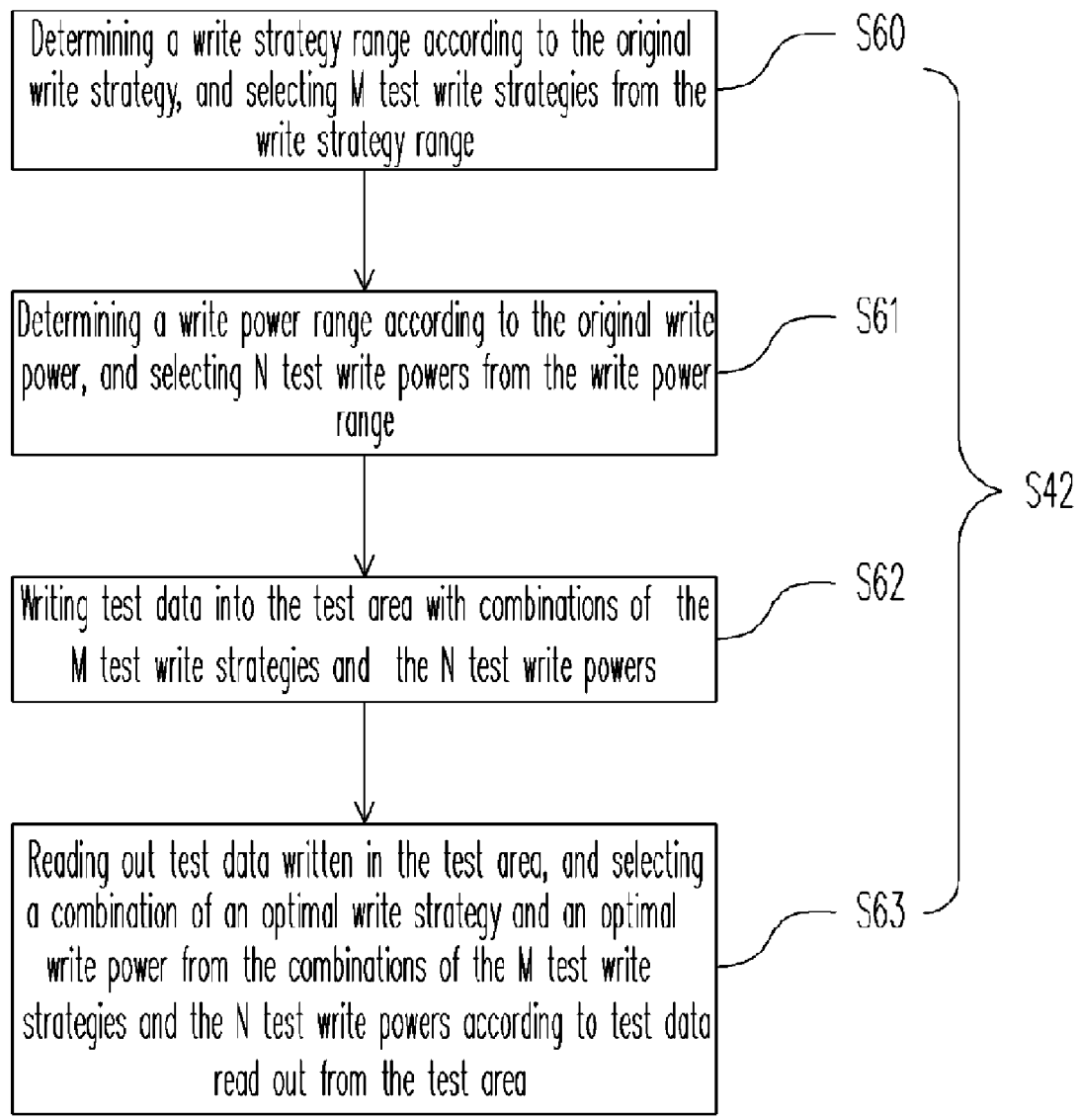
FIG. 6 is a flow chart illustrating the steps of dynamically adjusting a combination of the original write strategy and the original write power of FIG. 4 according to another embodiment of the invention.

FIG. 6 is a flow chart illustrating step S42 of FIG. 4 of dynamically adjusting a combination of the original write strategy and the original write power according to another embodiment of the invention. Referring to FIG. 6, steps S60 and S61 are respectively same with steps S50 and S51 of FIG. 5. Therefore, step S62 includes writing test data into the test area with combinations of test write strategies Td1 through TdM and test write powers P1 through PN. In other words, it includes writing test data into the test area respectively with combinations of the write strategy and the write powers as (Td1, P1), (Td1, P2), (Td1, P3) ... d1, PN), (Td2, P1), (Td2, P2), (Td2, P3) ... (d2, PN) ... (TdM, P1), (TdM, P2), (TdM, P3) ... (TdM, PN).

Finally, step 63 includes reading out test data written in the test area, and determining a combination of the optimal write power and the optimal write strategy (Tdo, Po) from the combinations of test write strategies Td1 through TdM and test write powers P1 through PN. As a result, it can be seen that the embodiment needs to write (N×M) sets of test data into the test area for obtaining a combination (Tdo, Po) of the optimal write strategy and the optimal write power.

Figure 7:
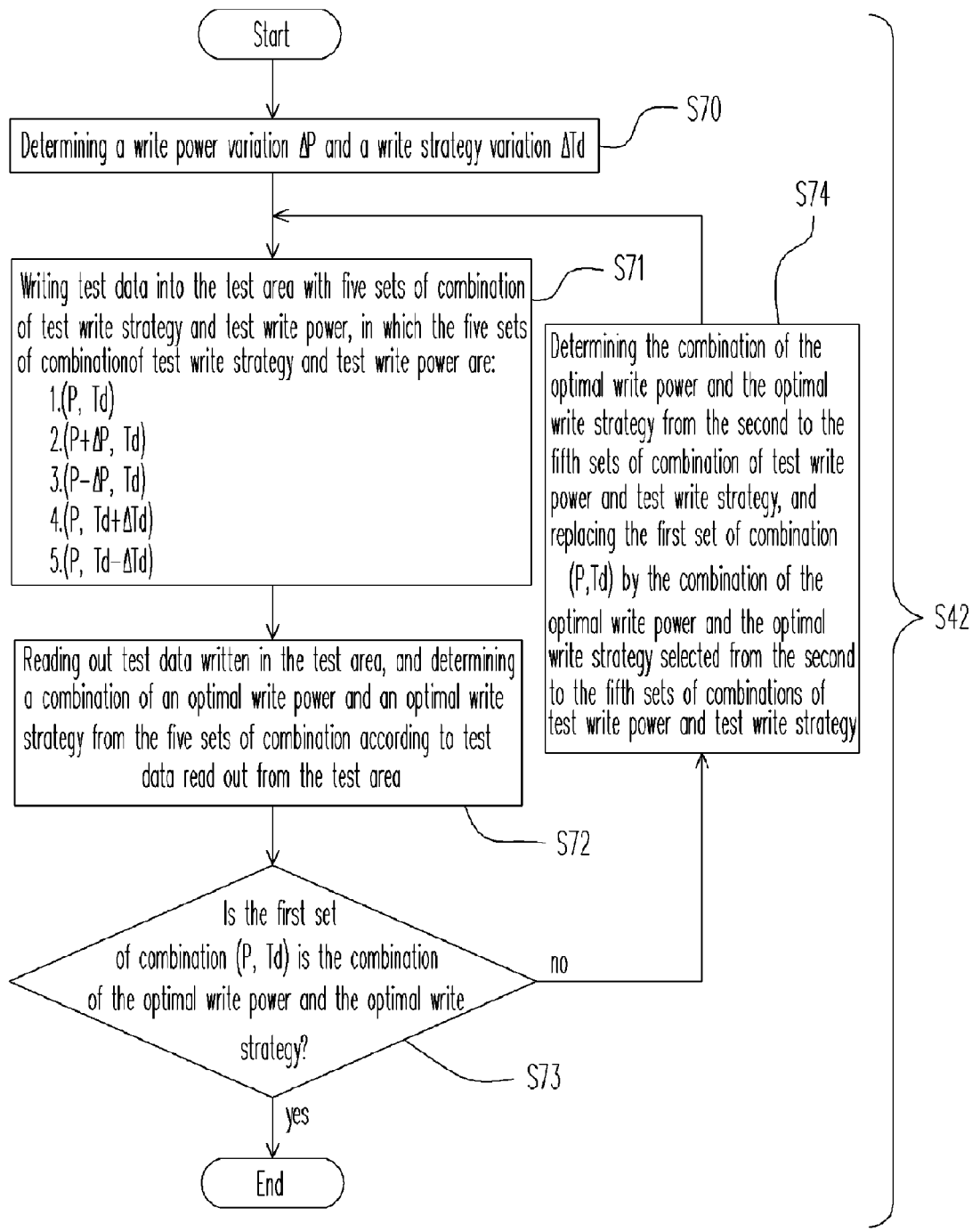
FIG. 7 is a flow chart illustrating the steps of dynamically adjusting a combination of the original write strategy and the original write power of FIG. 4 according to a still embodiment of the invention.

FIG. 7 is a flow chart illustrating step S42 of FIG. 4 of dynamically adjusting a combination of the original write strategy and the original write power according to still another embodiment of the invention. Referring to FIG. 7, step S70 includes determining a write power variation $\Delta$P and a write strategy variation $\Delta$Td. Then, step S71 includes writing the test data into the test area with five sets of combination of test write strategy and test write power; the five sets of combinations include (P, Td), (P+$\Delta$P, Td), (P−$\Delta$P, Td), (P, Td+$\Delta$Td), (P, Td−$\Delta$Td), wherein P represents the original write power and Td represents the original write strategy.

Step S72 includes reading out test data written in the test area, and determining a combination (Po, Tdo) of an optimal write power and an optimal write strategy from the foregoing five sets of combinations, wherein Po represents the optimal write power and Tdo represents the optimal write strategy.

Therefore, step S73 is for judging whether the first set of combination (P, Td) is a combination of the optimal write power and the optimal write strategy, and if it is not, then the process moves to step S74. Step S74 includes selecting a combination of an optimal write power and an optimal write strategy from the rest four sets of combinations, and substituting for the combination of (P, Td) of step S71, wherein the steps S71 through S74 will be repeated till the judging result is affirmative.

For example, we assume the initial value of P is P1 and the initial value of Td is Td1. If the judgment is "no" at step S73, the process goes to step S74. If the second set of combination (P+$\Delta$P, Td)=(P1+$\Delta$P, Td1) is the combination of the optimal write power and the optimal write strategy selected from the rest four sets of combinations at step S74 and the process goes to step S71. In this time, the first set of combination (P, Td) is substituted by (P1+$\Delta$P, Td1) at step S71. Then, (P, Td), (P+$\Delta$P, Td), (P−$\Delta$P, Td), (P, Td+$\Delta$Td) and (P, Td−$\Delta$Td) become (P1+$\Delta$P, Td1), (P1+2$\Delta$P, Td1), (P1, Td1), (P1+$\Delta$P, Td1+$\Delta$Td) and (P1+$\Delta$P, Td1−$\Delta$Td), respectively. Again, if the judgment is "no" at step S73, the process goes to step S74. If the second set of combination (P+$\Delta$P, Td)=(P1+2$\Delta$P, Td1) is the combination of the optimal write power and the optimal write strategy selected from the rest four sets of combinations at step S74 and the process goes to step S71. In this time, the first set of combination (P, Td) is substituted by (P1+2$\Delta$P, Td1) at step S71. Then, (P, Td), (P+$\Delta$P, Td), (P−$\Delta$P, Td), (P, Td+$\Delta$Td) and (P, Td−$\Delta$Td) become (P1+2$\Delta$P, Td1), (P1+3$\Delta$P, Td1), (P1+$\Delta$P, Td1), (P1+2$\Delta$P, Td1+$\Delta$Td) and (P1+2$\Delta$P, Td1−$\Delta$Td), respectively. The steps S71 through S74 will be repeated till the judgment is "yes" at step S73.

Figure 8:
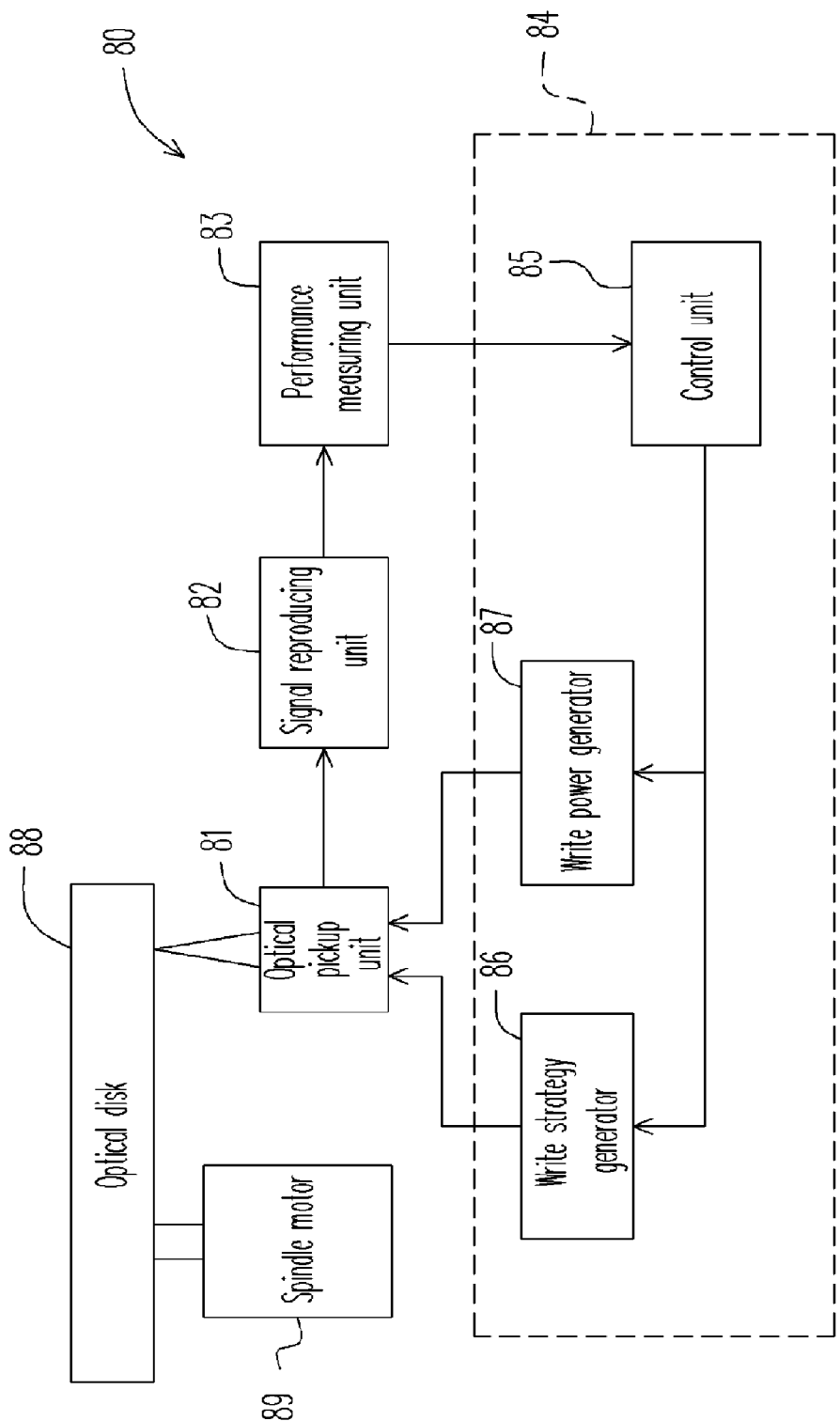
FIG. 8 is a circuit block diagram of a recording device according to an embodiment of the invention.

FIG. 8 is a circuit block diagram of a recording device according to an embodiment of the invention. Referring to FIG. 8, an optical drive 80 is adapted for optimizing write parameters of an optical disk 88; the write parameters include write strategies and write powers. The optical drive includes an optical pickup unit 81, a signal reproducing unit 82, a performance measuring unit 83 and a write parameters optimizing control unit 84. The write parameters optimizing control unit 84 includes a control unit 85, a write strategy generator 86 and a write power generator 87. Also, the optical drive 80 may further include a spindle motor 89 for rotating the optical disk 88.

First, according to the type of the optical disk 88, the write parameters optimizing control unit 84 determines a combination of an original write strategy and an original write power according to the optical disk; then the control unit 85 controls the write strategy generator 86 and the write power generator 87 to respectively generate an original write strategy and an original write power; then the optical pickup unit 81 writes test data into a test area of the optical disk 88.

Afterward, the optical pickup unit 81 reads out test data written in the test area. The signal reproducing unit 82 reproduces the test data. Then, the performance measuring unit 83 measures a performance index of the reproduced test data; the performance, for example, includes measuring the jitter value or error rate of the test data. Then, the control unit 85 dynamically adjusts the combination of the original write strategy and the original write power to obtain a combination of an optimal write strategy and an optimal write power in accordance with the performance index measured by the performance measuring unit 83. And finally, the control unit 85 controls the write strategy generator 86 and the write power generator 87 to respectively generate an optimal write strategy and an optimal write power; and then the optical pickup unit 81 writes data into the optical disk 88.

In summary, before data being written in the optical storage medium, the present invention writes test data into the optical storage medium, reproduces the test data written in the optical storage medium for assessing the writing quality, and then instantly and dynamically adjusts the write strategy and the write power for obtaining a better writing quality when writing data into an optical storage medium. Moreover, because the write strategy can be dynamically adjusted before the optical storage medium being written, the difference between the response features of the pickup unit can be complemented.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A method for optimizing write parameters of an optical storage medium, the method being adapted for a recording device using the optical storage medium, comprising:
    loading the optical storage medium into the recording device, wherein the optical storage medium has a test area;
    determining a combination of an original write strategy and an original write power according to the optical storage medium;
    writing test data into the test area with the combination of the original write strategy and the original write power for dynamically adjusting the combination of the original write strategy and the original write power to obtain a combination of an optimal write strategy and an optimal write power; and
    writing data into the optical storage medium with the combination of the optimal write strategy and the optimal write power.

2. The method for optimizing write parameters of an optical storage medium according to claim 1, wherein the combination of the original write strategy and the original write power is determined according to information pre-stored in the optical storage medium or pre-adjusted information pre-stored in a memory means of the recording device, wherein the information comprises the type of the optical storage medium.

3. The method for optimizing write parameters of an optical storage medium according to claim 2, wherein the information further comprises at least one of the recording speed and recording parameter of the optical storage medium.

4. The method for optimizing write parameters of an optical storage medium according to claim 1, wherein the step of "writing test data into the test area with the combination of the original write strategy and the original write power for dynamically adjusting the combination of the original write strategy and the original write power to obtain a combination of an optimal write strategy and an optimal write power" comprises:
    determining a write strategy range according to the original write strategy, and selecting a plurality of test write strategies from the write strategy range; and
    determining a write power range according to the original write power, and selecting a plurality of test write powers from the write power range.

5. The method for optimizing write parameters of an optical storage medium according to claim 4, wherein the step of "writing test data into the test area with the combination of the original write strategy and the original write power for dynamically adjusting the combination of the original write strategy and the original write power to obtain a combination of an optimal write strategy and an optimal write power" further comprises:
    incorporating with the original write strategy, writing test data into the test area with the plurality of test write powers;
    reading out test data written in the test area, and determining an optimal write power from the plurality of test write powers according to test data read out from the test area;
    incorporating with the optimal write power, writing test data into the test area with the plurality of test write strategies; and
    reading out test data written in the test area, and determining an optimal write strategy from the plurality of test write strategies according to test data read out from the test area.

6. The method for optimizing write parameters of an optical storage medium according to claim 4, wherein the step of "writing test data into the test area with the combination of the original write strategy and the original write power for dynamically adjusting the combination of the original write strategy and the original write power to obtain a combination of an optimal write strategy and an optimal write power" further comprises:
    incorporating with the original write power, writing test data into the test area with the plurality of test write strategies;
    reading out test data written in the test area, and determining an optimal write strategy from the plurality of test write strategies according to test data read out from the test area;
    incorporating with the optimal write strategy, writing test data into the test area with the plurality of test write powers; and
    reading out test data from the test area, and determining an optimal write power from the plurality of test write powers according to test data read out from the test area.

7. The method for optimizing write parameters of an optical storage medium according to claim 4, wherein the upper limit of the write power range is determined by the original write power plus a given value, and the lower limit of the write power range is determined by the original write power minus another given value.

8. The method for optimizing write parameters of an optical storage medium according to claim 4, wherein the upper limit of the write strategy range is determined by a time parameter of the original write strategy plus a given value, and the lower limit of the write strategy range is determined by the time parameter of the original write strategy minus another given value.

9. The method for optimizing write parameters of an optical storage medium according to claim 8, wherein the time parameter comprises a shift-of-leading-edge time parameter.

10. The method for optimizing write parameters of an optical storage medium according to claim 1, wherein the step of "writing test data into the test area with the combination of the original write strategy and the original write power for dynamically adjusting the combination of the original write strategy and the original write power to obtain a combination of an optimal write strategy and an optimal write power" comprises:

determining a write strategy range according to the original write strategy, and selecting a plurality of test write strategies from the write strategy range;

determining a write power range according to the original write power, and selecting a plurality of test write powers from the write power range;

writing test data into the test area with combinations of the plurality of test write strategies and the plurality of test write powers; and reading out test data written in the test area, and determining a combination of an optimal write strategy and an optimal write power from the combinations of the plurality of test write strategies and the plurality of test write powers according to test data read out from the test area.

11. The method for optimizing write parameters of an optical storage medium according to claim 10, wherein the upper limit of the write power range is determined by the original write power plus a given value, and the lower limit of the write power range is determined by the original write power minus another given value.

12. The method for optimizing write parameters of an optical storage medium according to claim 10, wherein the upper limit of the write strategy range is determined by a time parameter of the original write strategy plus a given value, and the lower limit of the write strategy range is determined by the time parameter of the original write strategy minus another given value.

13. The method for optimizing write parameters of an optical storage medium according to claim 12, wherein the time parameter comprises a shift-of-leading-edge time parameter.

14. The method for optimizing write parameters of an optical storage medium according to claim 10, wherein the step of "determining a combination of an optimal write strategy and an optimal write power from the combinations of the plurality of test write strategies and the plurality of test write powers according to test data read out from the test area" is performed according to jitter value, bit error rate or other performance indices associated with test data read out from the test area.

15. The method for optimizing write parameters of an optical storage medium according to claim 1, wherein the step of "writing test data into the test area with the combination of the original write strategy and the original write power for dynamically adjusting the combination of the original write strategy and the original write power to obtain a combination of an optimal write strategy and an optimal write power" comprises steps of:

A. determining a write power variation and a write strategy variation;

B. writing test data into the test area with five sets of combination of test write strategy and test write power, wherein the first set of combination of test write power and test write strategy comprises the original write power and the original write strategy;

the second set of combination of test write power and test write strategy comprises the original write power plus the write power variation and the original write strategy;

the third set of combination of test write power and test write strategy comprises the original write power minus the write power variation and the original write strategy;

the fourth set of combination of test write power and test write strategy comprises the original write power and the original write strategy plus the write strategy variation; and the fifth set of combination of test write power and test write strategy comprises the original write power and the original write strategy minus the write strategy variation;

C. reading out test data written in the test area, and determining a combination of an optimal write power and an optimal write strategy from said five sets of combination according to test data read out from the test area;

D. judging whether the first set of combination of test write power and test write strategy is the combination of the optimal write power and the optimal write strategy;

E. determining the combination of the optimal write power and the optimal write strategy from the second to the fifth sets of combination of test write power and test write strategy, replacing the first set of combination of test write power and test write strategy at the step B by the combination of the optimal write power and the optimal write strategy selected from the second to the fifth sets of combinations of test write power and test write strategy, and repeating the steps B through D if the first set of combination of test write power and test write strategy is not the combination of the optimal write power and the optimal write strategy; and F. not repeating the steps B through D if the first set of combination of test write power and test write strategy is the combination of the optimal write power and the optimal write strategy.

16. The method for optimizing write parameters of an optical storage medium according to claim 15, wherein the step of "determining the combination of the optimal write power and the optimal write strategy from the second to the fifth sets of combination of test write power and test write strategy" is performed according to jitter value, bit error rate or other performance indices associated with test data read out from the test area.

17. A recording device for an optical storage medium, the recording device being used for optimizing write parameters of the optical storage medium wherein the optical storage medium has a test area and the write parameters comprise write strategy and write power; the recording device comprising:

an optical pickup unit, for physically reading/writing data from/into the optical storage medium;

a signal reproducing unit coupled to the optical pickup unit for reproducing the data read from the optical storage medium;

an performance measuring unit coupled to the signal reproducing unit for measuring a performance index of the data read from the optical storage medium; and a write parameters optimizing control unit coupled to the performance measuring unit and the optical pickup unit for determining a combination of an original write strategy and an original write power according to the optical storage medium, writing test data by the optical pickup unit into the test area with the combination of the original write strategy and the original write power for dynamically adjusting the combination of the original write strategy and the original write power to obtain a combination of an optimal write strategy and an optimal write power in accordance with the performance index, and writing data into the optical storage medium with the combination of the optimal write strategy and the optimal write power.

18. The recording device for an optical storage medium according to claim 17, wherein the write parameters optimizing control unit further comprises:

a write strategy generator coupled to the optical pickup unit for generating a write strategy to control the optical pickup unit to read/write data from/into the optical storage medium;

a write power generator coupled to the optical pickup unit for generating a write power to control the optical pickup unit to read/write data from/into the optical storage medium; and a control unit coupled to the performance measuring unit, the write strategy generator and the write power generator for determining the combination of the original write strategy and the original write power according to the storage medium, writing test data into the test area with the combination of the original write strategy and the original write power respectively generated from the write strategy generator and the write power generator for dynamically adjusting the combination of the original write strategy and the original write power to obtain the combination of the optimal write strategy and the optimal write power according to the performance index, and writing data into the optical storage medium with the combination of the optimal write strategy and the optimal write power respectively generated from the write strategy generator and the write power generator.

19. The recording device for an optical storage medium according to claim 17, wherein the performance index is jitter value, bit error rate or other performance indices associated with test data read out from the test data.

20. The recording device for an optical storage medium according to claim 17, wherein the combination of the original write strategy and the original write power is determined according to information pre-stored in the optical storage medium or pre-adjusted information pre-stored in a memory means of the recording device, wherein the information comprises at least one of the type, recording speed and recording parameter of the optical storage medium.

* * * * *